Oct. 22, 1963 H. DERSCHMIDT 3,107,733
ROTARY BLADE SYSTEM FOR USE IN HELICOPTERS AND LIKE AIRCRAFT
Filed July 13, 1960 2 Sheets-Sheet 1
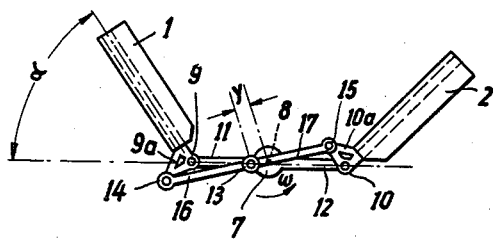
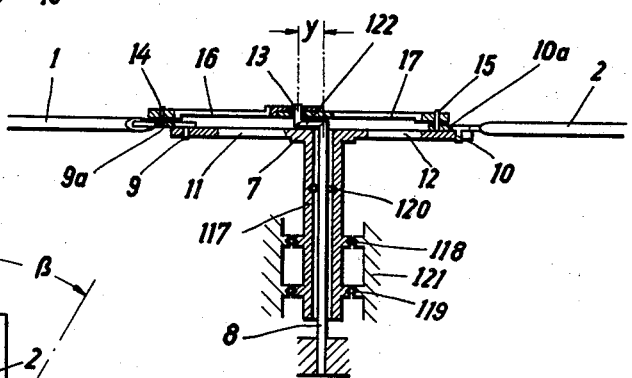
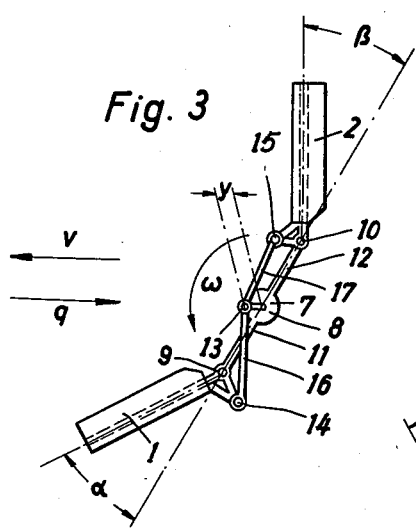
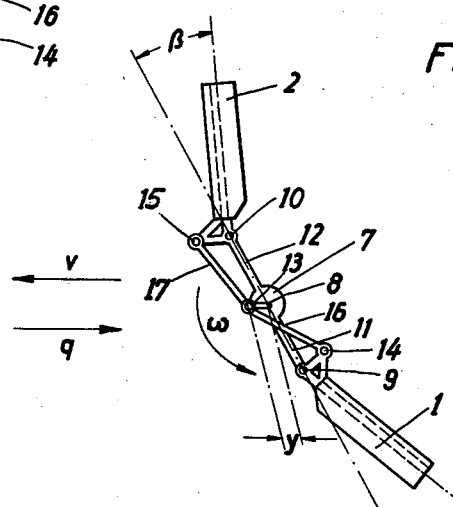
Inventor:
HANS DERSCHMIDT Oct. 22, 1963 H. DERSCHMIDT 3,107,733
ROTARY BLADE SYSTEM FOR USE IN HELICOPTERS AND LIKE AIRCRAFT
Filed July 13, 1960 2 Sheets-Sheet 2

Inventor:
HANS DERSCHMIDT

United States Patent Office 3,107,733
Patented Oct. 22, 1963

3,107,733
ROTARY BLADE SYSTEM FOR USE IN
HELICOPTERS AND LIKE AIRCRAFT
Hans Derschmidt, Bernhausen, Wurttemberg, Germany, assignor to Bölkow-Entwicklungen Kommanditgesellschaft, Ottobrunn, near Munich, Germany
Filed July 13, 1960, Ser. No. 42,700
Claims priority, application Germany July 9, 1955
7 Claims. (Cl. 170—169.25)

The present invention relates to rotary wing or blade systems for use in helicopters and like aircraft, and has as one of its objects the provision of means tending to improve the flight and stability characteristics of such helicopters. The present application is a continuation-in-part of my prior application Serial No. 596,558, filed July 9, 1956, now Patent 2,957,526.

Presently known helicopters or aircraft with rotary wing systems are limited with respect to their maximum attainable horizontal velocity because the air flow around the airfoil surfaces of the propeller blades becomes more non-uniform the higher the horizontal velocity. The maximum attainable velocity is actually determined on the one hand by the fact that the air speed of the forwardly moving foil surfaces or blade approaches the speed of sound and on the other hand by the fact that the rearwardly moving surfaces are contacted by air moving at such low speeds that the lift action of these surfaces breaks down periodically.

In order to displace or shift the presence of lift breakdown as far as possible into the range of high horizontal or ground speeds, the known rotary blade or wing systems are so selected, when they are intended to operate at relatively high horizontal velocities, that the blade tips move at high uniform peripheral velocities. A great amount of power input is required to overcome the resistance of the blade profile when the non-uniformity of the air stream against the blades is to be minimized through the use of high, uniform peripheral speeds.

The non-uniformity of the incident air stream during rotation of the blades is the fundamental reason why known rotary wing systems can attain only relatively small horizontal velocities.

In known rotary wing aircraft as aforesaid, the non-uniform streaming of air around the blades during horizontal flight is compensated for or balanced out by wobbling movements or by periodical changing of the adjustment angle, i.e., by feathering of the blades, so that the moment equilibrium is effected about the longitudinal axis. In such cases, however, the lift characteristics of each of the individual foil or blade elements are necessarily altered very greatly during each rotation.

Usually, therefore, profiles or blades are selected which are especially constructed for relatively small lift forces and which are relatively thin. In this manner, it is possible to avoid subjecting the forwardly moving foil elements to an especially high load for overcoming the air foil resistance.

The efficiency of such thin blades or profiles which are subjected to greatly changing lift factors or coefficients has its mean value for one rotation below the efficiency of a profile of greater thickness which is subjected to a less changing or constantly high lift factor during any one rotation. This may be compared with a rotary wing system operating during suspended flight and the profile of which is especially determined for constant high lift values.

The non-uniform contact of foils of known rotary wing systems by the air stream in horizontal flight brings about a smaller mean profile efficiency for each rotation and makes it necessary to choose thinner profiles which even in suspended flights have greater power requirements, their very thinness affecting the rigidity and strength of the air foils or blades adversely.

In known systems of this type, the non-uniform incident air flow past the blades during horizontal flight effects a recognized instability when contrasted with longitudinal inclinations in the case of ordinary lifting propellers. The higher peripheral velocities of the blade ends or tips required in the known aircraft for attaining higher horizontal speeds reduce the damping of the rotor in contrast with tilting disturbances.

Thus, the known lifting propellers can only be controlled with great difficulty or they require special, highly complex arrangements for their stabilization.

The above-mentioned high peripheral foil tip speeds required in known rotary wing systems cause greater noises even during suspended flight. When a helicopter moves forwardly at higher horizontal speeds, the forwardly moving blades will be subjected in a shock-like or impact-like manner to air flowing at very high velocities. The consequently occurring slapping noise is usually found to be more irritating than the noise of propellers of airplanes having rigid wings.

It is, therefore, also one of the primary objects of the invention to provide means improving the performance and stability qualities of rotary blade or wing systems of the aforesaid type.

It is another object of the present invention to provide means contributing to counteraction or elimination of the action of non-uniformity of the air stream against helicopter or like aircraft blades during rotation of the latter, whereby the advancing speed of said aircraft equipped with such a rotary blade system in the horizontal direction may be markedly increased.

To these ends, the invention resides substantially in the fact that the blades, besides the uniform rotational movements, execute positive additional movements in the plane of rotation of the rotor. Through these additional movements, the non-uniformity of the air stream flowing against the blades at high horizontal speeds and small mean peripheral velocity of the blade tips is reduced or balanced out.

For a rotary wing system according to the invention, a similar condition obtains in horizontal flight as it exists in suspended flight.

A further object of the invention is to provide means enabling all disadvantages of the known devices which result from the necessary high peripheral velocity of the blade tips and from the large non-uniformity of the air flow about the blades to be minimized or completely eliminated.

Yet a further object of the present invention is the provision of means affording a novel and improved rotor structure for use in helicopters and like aircraft, which structure exhibits a great number of advantages with respect to known arrangements of this type.

According to another object of the invention, means are provided to ensure that the blade tips may be moved with substantially reduced peripheral velocities.

Still another object of the invention is to provide means conducive to thicker profiles with high lift coefficients in rotor structures as aforesaid which in conjunction with the great rotor diameters employed make possible the expenditure of minimum power during suspended flight.

Another advantage resulting from the implementation of the above-objects is that the rotary wing system can attain higher horizontal speeds with less power requirements, it is easier to control and it suppresses irritating noise to a greater extent than has heretofore been possible.

During the swinging movements of the blades, an additional movement thereof in the rotor plane in contrast to the uniform rotation of the rotor hub is executed. Upon accurately controlled swinging movements during one rotation in horizontal flight, the non-uniformity of the incidents of the air stream can be balanced out especially for the aerodynamically most effective outer parts of the blades.

This is the case when the forwardly moving blades are retarded with respect to their mean rotational speeds and when the rearwardly moving blades are accelerated with respect to their mean rotational speeds.

The known swinging movement which tends to adjust itself in accordance with the free play of forces exhibits, however, a general phase displacement relative to the construction according to the invention which has the desired operation, or in other words the non-uniformity of the air stream incident on freely swinging blades is greater than that of the air stream incident on blades without swinging movement.

In known rotary wing or blade systems, the swinging movement is, thus, damped by special mechanism in order to prevent increase of the air flow non-uniformity above controllable limits. Only by positively operating drive or control means as provided by the present invention can the additional blade movements be attained which, during horizontal flight, at all times minimize the non-uniformity of air flow against and about the blades.

A further object of the invention is the provision of means aiming at a stable self-swinging rotary wing or blade system in which, upon occurrence of displacement forces acting upon the system, the consequent forced movements and lagging movement produced will be of equal natural frequency.

These and other objects of the invention will become further apparent from the following detailed description, reference being made to the accompanying drawings, showing preferred embodiments of the invention.

In the drawings:

FIG. 1 is a schematic view, in elevation, of a rotary blade system, including a drive mechanism, pursuant to the present invention;

FIG. 2 is a sectional view taken lengthwise of the axis of the rotary blades shown in FIG. 1;

FIGS. 3 and 4 are perspective views of the rotary blade system shown in FIG. 1, with the rotary blades shown in two different positions, respectively, from that shown in FIG. 1;

Figure 5:
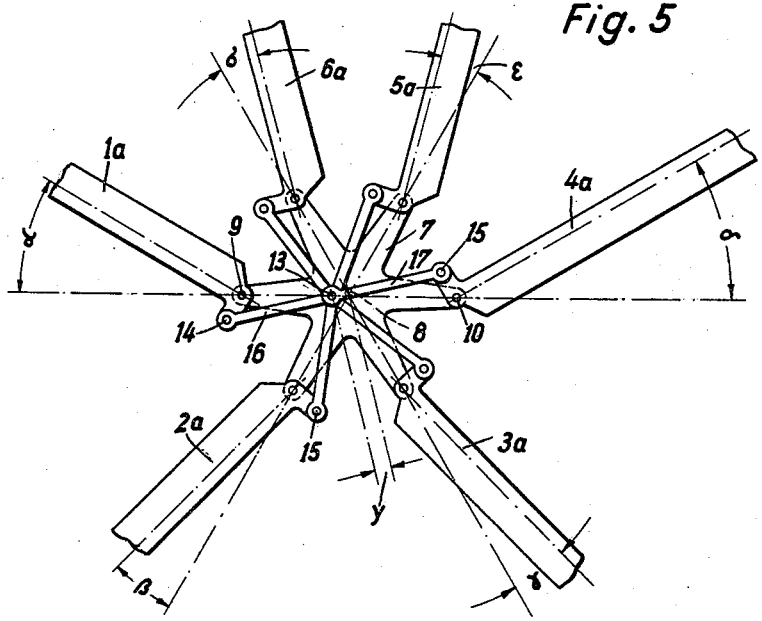
FIG. 5 is a diagrammatic fragmentary top plan view of a rotary blade system pursuant to another embodiment of the invention.

Referring now more particularly to FIGS. 1 to 4 in detail, there is shown a control means for helicopter rotary blade systems pursuant to the present invention. Said figures illustrate different positions of blades or heaters 1 and 2 carrying out pivotal lead and lag movements in a rotary system, whereby said pivotal movements reduce or counteract non-uniformity of the air stream due to the translatory stream $q$ (FIG. 3) when the hub 7 rotates uniformly with angular velocity $w$ and advances with the translatory speed V. A more complete series of successive positions of said blades is illustrated in FIGS. 1 through 13 of my previously identified prior application.

Pursuant to the control means of the present invention the pivotal movements of the blades 1 and 2 are positively controlled. The fixed eccentric pin 13 presents relative to the center axle 8 of hub 7 an eccentricity $y$. To blades 1 and 2 pivotable or rotatable about pins 9 and 10 which are located on arms 11 and 12 respectively, are connected crank arms 9a, 10a, which in turn extend at right angles to the spars of the blades, said arms terminating at the pins 14 and 15, respectively. Between these pins 14, 15 and eccentric pin 13, there extend connecting rods or elements 16 and 17.

As can be seen in FIG. 1 arms 11 and 12 of the rotary axis 8 receive at their ends oscillating pins 9 and 10 to which are linked blades 1 and 2. In the blade arrangement the distance between the centers of each pin 9 and 10 from rotary axis 8 is at least as great as the equivalent pendulum length of oscillation of blades 1 and 2. The equivalent pendulum length referred to above is set forth in detail in a book called "Mechanics," vol. 1, by Arnold Summerfield, published by the Academic Press Inc., 1952, New York, in paragraphs 16 and 17. As set forth in the reference referred to, the comparison between a simple pendulum described in paragraph 15 and a compound pendulum described in paragraph 16 is indicated. The equivalent pendulum length is set forth as $l_p$.

The resonance oscillation occurs when the distance of the rotary joint from the axis of rotation is equal to the equivalent pendulum length $l_p$. The reason for this appears from the formula for the oscillation time of the compound pendulum:

$$T_s = 2 \cdot \pi \cdot \sqrt{\frac{\text{Moment of inertia}}{\text{Reversely directed momentum per deflection}}}$$

If this equation is placed into the formulas for the corresonding momentum it follows that the equivalent pendulum length $l_p$ is equal to the distance $e$ of the rotary joint from the rotary axis that is $l_p = e$. The consequent corollary is drawn from the resonance requirement according to which the oscillation period of the free rotary movement is equal to the required time for the rotation of the rotor:

$$T_s = T_d = \frac{2\pi}{\omega}$$

The equation $l_p = e$ is the requirement for the resonance between the rotary speed and the rotary movement of the rotary blades.

In a parallel field of constant magnitude the movement equation for a pendulum with reduced pendulum length is:

$$\eta'' = \frac{g'}{l_{\text{red}}} \sin \alpha$$

For a centrifugal pendulum in a centrifugal field which is radial and increases outwardly the equation is:

$$\zeta'' = \frac{e_0 \omega^2}{l_{\text{red}}} \sin \zeta$$

Disregarding the different designations for the various magnitudes, these two formulas are entirely equal. The earth acceleration "$g$" of the first equation corresponds to the product of the pivot joint distance and the square of the rotor speed of the second equation.

When hub 7 rotates with uniform angular speed $w$, then the connecting rods 16, 17 due to the eccentricity $y$ of the eccentric pin 13, will pivot crank arms 9a and 10a with a periodic movement so that both blades 1 and 2 are forced to execute pivotal lead and lag movements according to the various positions indicated in FIGS. 1 to 13 inclusive of my prior application.

As best shown in FIG. 2, the suspension rotor shaft comprises the spindle or axle 8 extending through a hollow shaft 117 of the rotor, ball bearing means 118—119 being provided between the shaft 117 and the stationary rotor structure 121 and ball bearing means 120 being provided between the spindle and the hollow shaft. The spindle terminates in a crank 122, the crank end constituting the eccentric pin 13. In the direction of flight, the pin 13 always remains at the location shown in FIG. 2, ahead of the rotary axis of the aircraft.

Pursuant to an important aspect of the present invention, the distance between respective crank arms 9a and 10a as measured from the center of pins 9 and 10 to the center of the central axle 8 is equal to the reduced oscillatory length of the rotor blades. This distance is so chosen, with regard to the mass distribution of the blades, that resonance is obtained between natural oscillation and forced or imparted oscillation. Consequently, the rotor is so constructed as to achieve such resonance.

Figure 6:
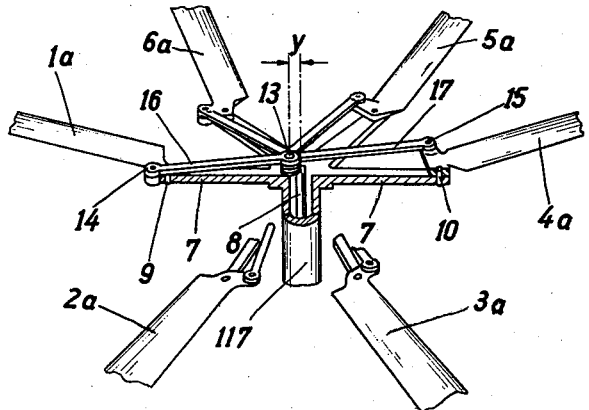
FIG. 6 is a perspective view of the embodiment shown in FIG. 5, with parts removed and cut away therefrom.
Figure 7:
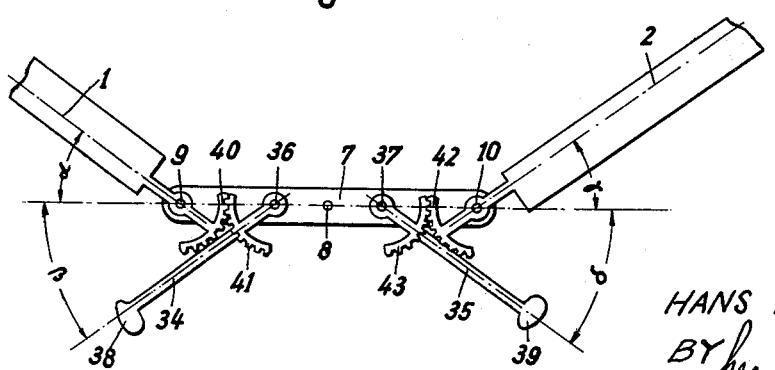
FIG. 7 is a schematic illustration showing means for balancing the masses of impeller blades carrying out oscillatory movements relative to a hub.

Referring now further to FIG. 7 it will be realized that blades 1 and 2 are rotatably arranged on pivots 9 and 10, whereas arms 34 and 35 are rotatable about pins 36, 37 provided on hub 7. The ends of arms 34, 35 are provided with counterweights 38, 39. Through toothed sector gears 40, 41 and 42, 43 these counterweights are forced to move in opposed directions relative to hub 7. Thus, the extent or amplitudes $\alpha$ and $\gamma$ of movements of the blades correspond to the amplitudes $\beta$ and $\delta$ of the counterweights. Through suitable determination and adjustment of the distribution of masses and the lengths of the lever arms for the blades and their counterweights, it becomes possible that the center of gravity of the complete blade system coincides always with the axis 8, so that absolute quietness of run is afforded to the rotary blade system, as disclosed in FIGS. 1 to 13, of my prior application. It will be noted that in the present embodiment also, the distribution of the masses of the rotary blades is so chosen that resonance is obtained between natural oscillation and forced or imparted oscillation.

Referring now to FIGS. 5 and 6, there is depicted a rotary blade system having a plurality of oscillatable or pivotable blades 1a, 2a, 3a, 4a, 5a and 6a, which during rotation will not permit any substantial displacement of the center of gravity, the latter always remaining fixed on that side where the blades are closer together (for instance, between blades 5a and 6a).

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In a rotary blade system for aircraft adapted for horizontal flight; rotatable hub means including a pair of fixed rigid arms and having a substantially vertical axle adapted to be driven at uniform angular velocity, a plurality of elongated blades arranged horizontally in spaced relation to each other and pivoted to said arms and rotatable therewith, said blades being located substantially in a common horizontal plane and being movable for lead and lagging blade movements in said plane, control means including a pair of connecting elements pivotally connected to said blades and adapted to effect predetermined movements thereof in said common plane and relative to said hub means, whereby said blades may be adjusted in position relative to said hub means for overcoming non-uniform effects of air flowing past said blades during rotation of said hub means and concurrent horizontal flight of said aircraft, said control means further including a pivot pin spaced from and located in an eccentric position relative to said hub means, said connecting elements being pivoted to said pin and being oscillatable during rotation of said hub means, and bell crank lever means pivoted to said connecting elements and said arms for translating oscillatable movement into swinging movements of said blades, the distance between the center of the pivotal connection of said bell crank lever means with said connecting elements and the axis of rotation of said hub means being such that resonance between free and forced oscillatory movements of said blades is substantially obtained.

2. A system as set forth in claim 1, wherein said distance is substantially equal to the equivalent pendulum length of oscillation of said blades.

3. In a rotary blade system for aircraft adapted for horizontal flight; rotatable hub means including a plurality of integral rigid arms and having a substantially vertical axle adapted to be driven at uniform angular velocity, a similar plurality of elongated blades arranged horizontally in spaced relation to each other and pivoted to said arms and rotatable therewith, said blades being located substantially in a common horizontal plane and being movable for lead and lagging blade movements in said plane, control means including a similar plurality of connecting elements pivotally connected to said blades and adapted to effect predetermined movements thereof in said common plane and relative to said hub means, whereby said blades may be adjusted in position relative to said hub means for overcoming non-uniform effects of air flowing past said blades during rotation of said hub means and concurrent horizontal flight of said aircraft, said control means further including a pivot pin spaced from and located in an eccentric position relative to said hub means, said connecting elements being pivoted to said pin and being oscillatable during rotation of said hub means, and integral bell crank lever means on each blade pivoted to one of said connecting elements and one of said arms for translating oscillatable movements into swinging movements of said blades, the distance between the center of the pivotal connection of said bell crank lever means with said connecting elements and the axis of rotation of said hub means being such that resonance between free and forced oscillatory movements of said blades is substantially obtained.

4. A system as set forth in claim 3, wherein said distance is substantially equal to the equivalent pendulum length of oscillation of said blades.

5. A rotary blade system for aircraft adapted for horizontal flight comprising rotatable hub means, a plurality of elongated blades arranged horizontally in spaced relationship to each other and pivoted to said hub means and rotatable therewith, said blades being located substantially in a common horizontal plane and being pivotable about said hub means for lead and lagging blade movements in said plane, means to rotate said hub means, and control means actuated by rotation of said blade hub means including a connecting element pivotally connected to each of said blades adapted to effect a predetermined pivotal lead and lag movement thereof in said common plane relative to said hub means the movement being such to effect resonance between the free and forced oscillatory movements of said blades.

6. A rotary blade system according to claim 5, wherein said connecting element is pivoted on said hub means at a spaced location from the center of rotation thereof, and bell crank means pivotally connected to a respective blade and said connecting element, and wherein the distance between the center of the pivotal connection of said bell crank means with said connecting element and the axis of rotation of said hub means is such that resonance between said free and forced oscillatory movements of said blades is substantially obtained.

7. A rotary blade system for aircraft according to claim 5, wherein said control means includes a weighted member pivotally connected to said hub means, and gear means connected between said weighted member and said connecting element, said weighted member being of a weight and of a location such that said blade will be pivoted with a lead and lag movement by pivoting of such weighted member in a manner to effect resonance between the free and forced oscillatory movements of said blades.

References Cited in the file of this patent

UNITED STATES PATENTS 2,511,687 Andrews _____ June 13, 1950
2,957,526 Derschmidt _____ Oct. 25, 1960

FOREIGN PATENTS 496,055 Italy _____ June 30, 1954